Dec. 25, 1956 A. P. DÖRPER 2,775,136
STEERING GEAR FOR MOTOR VEHICLES
Filed Feb. 14, 1955
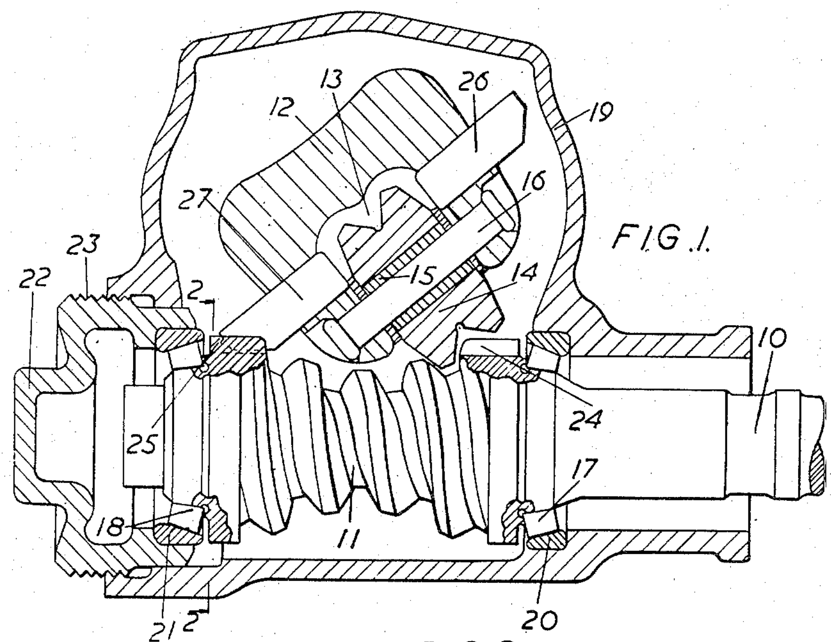
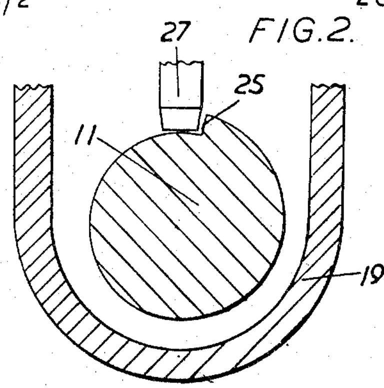
Inventor
Alfred Doerper
By
H. E. Jones
Attorney

United States Patent Office 2,775,136

Patented Dec. 25, 1956

2,775,136

STEERING GEAR FOR MOTOR VEHICLES

Alfred Peter Dörper, Russelsheim (Main), Germany, assignor to General Motors Corporation, Detroit, Mich., a corporation of Delaware Application February 14, 1955, Serial No. 487,938

Claims priority, application Germany March 6, 1954

12 Claims. (Cl. 74—500)

The invention relates to steering gears for motor vehicles.

It is desirable to limit the angle of turn of the dirigible wheels of a vehicle to avoid fouling the chassis or steering linkage. The angle of turn can be limited by arranging stops directly on the axle stubs of each dirigible wheel, these preventing further turning of the wheels and further steering movement.

Recently however use has been made of elastic mounting the front cross member of the chassis to which the wishbone links are pivoted. These are fitted between the front cross member and the chassis frame to ensure that vibrations, shocks and the like which arise when the wheels roll over the road surface, are damped and kept away from the passenger space. The greater the volume of rubber and cushioning and damping qualities, the greater will necessarily be the movements of the front cross member with respect to the frame. This not only unfavourably influences the geometry of the steering system, but creates a risk that no safe limitation of the maximum angle of turn is provided, as the stops may not engage when intended or when engaged may without any great effort cause deformation of the elastic mounting between the front cross member and vehicle frame so that the driver may not be aware of the danger and the interenegaging parts of the steering gear may pass out of engagement.

It has been proposed to provide stops in the interior of the steering gear housing which are engaged by the parts of the pitman shaft. While such constructions ensure with certainty that the interengaging gear parts do not become disengaged and give clearly perceptible check to the driver, they have the drawback that in the extreme positions, inadmissibly high loads occur at the flanks of the toothed gear parts.

The invention overcomes these defects by so arranging the stops which limit the angle of turn, that the engagement of the stops does not increase the stresses in the steering gear and steering system.

In particular in extreme positions of steering movement, no additional load is placed on the flanks of the toothed gear parts.

A further feature of the invention is that the stops for limiting the angle of turn are entirely disposed within the housing of the steering gear. One radial stop is arranged on the steering shaft worm or on the steering shaft and the other stop is on the pitman shaft.

The driver feels a perceptible check, but the forces involved are not transmitted through the teeth but through the stops.

Other and further objects of the invention will become apparent from the following description of a preferred embodiment given by way of example with reference to the accompanying drawings, in which:

Figure 1 is a section through a steering gear according to the invention, and

Figure 2 a section on the line 2—2 of Figure 1.

Referring to the drawings, the steering gear is of the cam and lever type and comprises a steering shaft 10 having a globoidal worm 11 at one end thereof. The worm portion 11 of the shaft 10 is mounted in thrust roller bearings 17 and 18. The outer ring 20 of the roller bearing 17 is fitted directly into an enclosing housing 19 and the outer ring 21 of the other roller bearing 18 is fitted into a recessed bearing cap 22 which is screwed into the casing 19 by means of a screw-thread 23.

A pitman shaft 12 in the form of a forging having a cavity 13 is rockably mounted in the housing 19. In the cavity 13, a double-toothed cam follower 14 is rotatably mounted on a pin 16 fixed in the shaft 12 by means of a sleeve 15. The cam follower 14 engages the thread of the globoidal worm 11 and transmits steering movements from a steering wheel (not shown) on the steering shaft 10 to a pitman arm (not shown) which passes on the movements through linkages to the dirigible wheels.

The worm 11 also has two radial stops 24 and 25 one at each end and projecting above the level of the lands at the ends of the worm. The stops 24 and 25 face in opposite directions. On each side of the pitman shaft 12, a pin 26, 27 is pressed into the shaft and protrudes in a direction parallel to the axis of the steering shaft 10 when the pitman shaft 12 is centred.

In operation, the steering shaft 10 is rotated to rock the pitman shaft 12 through the worm 11 and follower 14. If such rotation is continued until the dirigible wheels approach positions in which they would foul parts of the vehicle chassis or steering linkage, the pin 27 will have been rocked with the pitman shaft 12 into the path of the radial stop 25 on the worm 11 (Figure 2). The stop 25 engages the pin 27 on further rotation of the steering shaft 10 and positively limits such rotation. At the same time no additional strain is placed on the follower 14 by the worm 11.

The action when the steering shaft 10 is rotated in the reverse direction is similar except that the stop 24 engages the pin 26.

The angular relationship between the stops 24 and 25 and the plane through the steering shaft axis and the follower axis in the centred position is such as to allow rotation of the steering shaft up to the position at which further turning of the dirigible wheels is to be prevented.

While the stops 24 and 25 have been described as radial, it will be appreciated that the engagement surfaces of the stops need not be precisely radial so long as they project above the adjacent portion of the worm so as to avoid engagement of the pins with the peripheral surface of the worm.

The pins 26 and 27 may be integral with the pitman shaft 12 or may be formed as extensions of the follower pin 16, as will be understood.

The invention is not limited to the practical embodiment shown, but may be applied, for example, to steering gears having a worm and segment, instead of a cam and follower.

It is therefore to be understood that the invention is not intended to be limited to the embodiment shown and described herein but only by the scope of the claims which follow.

I claim:

1. In a steering gear, the combination of a steering shaft, a worm on said shaft, a pitman shaft rockably disposed at substantially right angles to said worm, operative connection means between said worm and said pitman shaft to cause rocking of said pitman shaft upon rotation of said worm in either direction, a pair of projections on said pitman shaft movable towards and away from said worm upon rocking of said pitman shaft, and a pair of radial stops, one at each end of said worm, respectively adapted to engage one of said projections in a limit position of said pitman shaft.

2. In a steering gear the combination of a steering shaft, a worm on said shaft, a pitman shaft rockably disposed at substantially right angles to said worm, a toothed roller follower rotatably mounted on said pitman shaft and engaged in said worm to cause rocking of said pitman shaft upon rotation of said worm in either direction, a pair of projections on said pitman shaft movable towards and away from said worm, upon rocking of said pitman shaft, and a pair of radial stops, one at each end of said worm, respectively adapted to engage one of said projections in a limit position of said pitman shaft.

3. In a steering gear the combination of a steering shaft, a worm on said shaft, a pitman shaft rockably disposed at substantially right angles to said worm, operative connection means between said worm and said pitman shaft to cause rocking of said pitman shaft upon rotation of said worm in either direction, a pair of pins secured one on each side of said pitman shaft and movable towards and away from said worm upon rocking of said pitman shaft, and a pair of radial stops, one at each end of said worm, respectively adapted to engage one of said pins in a limit position of said pitman shaft.

4. In a steering gear the combination of a steering shaft, a worm on said shaft, a pitman shaft rockably disposed at substantially right angles to said worm, a toothed roller follower rotatably mounted on said pitman shaft and engaged in said worm to cause rocking of said pitman shaft upon rotation of said worm in either direction, a pair of pins secured one on each side of said pitman shaft and movable towards and away from said worm upon rocking of said pitman shaft, and a pair of radial stops, one at each end of said worm, respectively adapted to engage one of said pins in a limit position of said pitman shaft.

5. In a steering gear, the combination of a steering shaft, a worm on said shaft, a pitman shaft rockably disposed at substantially right angles to said worm, operative connection means between said worm and said pitman shaft to cause rocking of said pitman shaft upon rotation of said worm in either direction, a pair of projections on said pitman shaft movable towards and away from said worm upon rocking of said pitman shaft and having a common axis transverse to the pitman shaft axis and substantially parallel to the steering shaft axis in the centered position, and a pair of radial stops, one at each end of said worm, respectively adapted to engage one of said projections in a limit position of said pitman shaft.

6. In a steering gear the combination of a steering shaft, a worm on said shaft, a pitman shaft rockably disposed at substantially right angles to said worm, a toothed roller follower rotatably mounted on said pitman shaft and engaged in said worm to cause rocking of said pitman shaft upon rotation of said worm in either direction, a pair of projections on said pitman shaft movable towards and away from said worm upon rocking of said pitman shaft and having a common axis transverse to the pitman shaft axis and substantially parallel to the steering shaft axis in the centred position, and a pair of radial stops, one at each end of said worm, respectively adapted to engage one of said projections in a limit position of said pitman shaft.

7. In a steering gear the combination of a steering shaft, a worm on said shaft, a pitman shaft rockably disposed at substantially right angles to said worm, operative connection means between said worm and said pitman shaft to cause rocking of said pitman shaft upon rotation of said worm in either direction, a pair of pins secured one on each side of said pitman shaft, movable towards and away from said worm upon rocking of said pitman shaft and having a common axis transverse to the pitman shaft axis and substantially parallel to the steering shaft axis in the centred position and a pair of radial stops, one at each end of said worm, respectively adapted to engage one of said pins in a limit position of said pitman shaft.

8. In a steering gear the combination of a steering shaft, a worm on said shaft, a pitman shaft rockably disposed at substantially right angles to said worm, a toothed roller follower rotatably mounted on said pitman shaft and engaged in said worm to cause rocking of said pitman shaft upon rotation of said worm in either direction, a pair of pins secured one on each side of said pitman shaft, movable towards and away from said worm upon rocking of said pitman shaft and having a common axis transverse to the pitman shaft axis and substantially parallel to the steering shaft axis in the centred position, and a pair of radial stops, one at each end of said worm, respectively adapted to engage one of said pins in a limit position of said pitman shaft.

9. In a steering gear, the combination of a steering shaft, a globoidal worm on said shaft, a pitman shaft rockably disposed at substantially right angles to said worm, a double tooth roller rotatably mounted on said pitman shaft and engaged in said worm to cause rocking of said pitman shaft upon rotation of said worm in either direction, a pair of projections on said pitman shaft movable towards and away from said worm upon rocking of said pitman shaft, and a pair of radial stops, one at each end of said worm, respectively adapted to engage one of said projections in a limit position of said pitman shaft.

10. In a steering gear, the combination of a steering shaft, a globoidal worm on said shaft, a pitman shaft rockably disposed at substantially right angles to said worm, a double tooth roller rotatably mounted on said pitman shaft and engaged in said worm to cause rocking of said pitman shaft upon rotation of said worm in either direction, a pair of pins secured one on each side of said pitman shaft and movable towards and away from said worm upon rocking of said pitman shaft, and a pair of radial stops, one at each end of said worm, respectively adapted to engage one of said pins in a limit position of said pitman shaft.

11. In a steering gear the combination of a steering shaft, a globoidal worm on said shaft, a pitman shaft rockably disposed at substantially right angles to said worm, a double tooth roller rotatably mounted on said pitman shaft and engaged in said worm to cause rocking of said pitman shaft upon rotation of said worm in either direction, a pair of projections on said pitman shaft movable towards and away from said worm upon rocking of said pitman shaft and having a common axis transverse to the pitman shaft axis and substantially parallel to the steering shaft axis in the centred position and a pair of radial stops, one at each end of said worm, respectively adapted to engage one of said projections in a limit position of said pitman shaft.

12. In a steering gear the combination of a steering shaft, a globoidal worm on said shaft, a pitman shaft rockably disposed at substantially right angles to said worm, a double tooth roller rotatably mounted on said pitman shaft and engaged in said worm to cause rocking of said pitman shaft upon rotation of said worm in either direction, a pair of pins secured one on each side of said pitman shaft, movable towards and away from said worm upon rocking of said pitman shaft and having a common axis transverse to the pitman shaft axis and substantially parallel to the steering shaft axis in the centred position, and a pair of radial stops, one at each end of said worm, respectively adapted to engage one of said pins in a limit position of said pitman shaft.

References Cited in the file of this patent

UNITED STATES PATENTS

| | | |
|---|---|---|
| 1,119,086 | Lee | Dec. 1, 1914 |
| 1,203,244 | Nash | Oct. 31, 1916 |
| 1,441,843 | Gahm | Jan. 9, 1923 |

FOREIGN PATENTS

| | | |
|---|---|---|
| 110,523 | Australia | May 2, 1940 |
| 579,491 | Great Britain | Aug. 6, 1946 |